US006446154B1

(12) United States Patent
Ajanovic et al.

(10) Patent No.: US 6,446,154 B1
(45) Date of Patent: Sep. 3, 2002

(54) METHOD AND MECHANISM FOR VIRTUALIZING LEGACY SIDEBAND SIGNALS IN A HUB INTERFACE ARCHITECTURE

(75) Inventors: Jasmin Ajanovic, Folsom, CA (US); Robert J. Greiner; Stephen S. Pawlowski, both of Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/433,824

(22) Filed: Nov. 3, 1999

(51) Int. Cl.[7] ............... G06F 13/00; G06F 13/36
(52) U.S. Cl. ............... 710/305; 370/420
(58) Field of Search ............... 710/305, 306, 710/311, 313, 72; 716/12; 370/419, 420, 351, 402

(56) References Cited

U.S. PATENT DOCUMENTS 5,065,355 A * 11/1991 Hayase
5,483,450 A * 1/1996 Titli et al.
5,970,066 A * 10/1999 Lowry et al.

* cited by examiner

Primary Examiner—Gopal C. Ray
(74) Attorney, Agent, or Firm—Blakely Sokoloff Taylor & Zafman LLP

(57) ABSTRACT

According to one embodiment, a method comprises receiving a first set of status signals at an input/output control hub (ICH), transmitting a first set of virtual signals corresponding to the first set of status signals to a memory control hub (MCH) via a hub interface. Subsequently, the first set of virtual signals are transmitted to a central processing unit (CPU). The first set of status signals corresponding to one or more legacy operations in a computer system.

19 Claims, 10 Drawing Sheets

METHOD AND MECHANISM FOR VIRTUALIZING LEGACY SIDEBAND SIGNALS IN A HUB INTERFACE ARCHITECTURE

FIELD OF THE INVENTION

The present invention pertains to computer systems. More particularly, the invention pertains to virtualization of legacy side-band interfaces in a computer system having a hub interface architecture.

BACKGROUND OF THE INVENTION

Prior computer systems typically rely on busses such as the Peripheral Component Interconnect (PCI) bus adhering to a Specification Revision 2.1 bus developed by the PCI Special Interest Group of Portland Oreg., to allow computer system chipset components to communicate with one another. For example, a transaction originating at a processor and intended for a disk drive might first be delivered to a first chipset component that serves as an intermediary between the processor bus and a PCI bus. The first chipset component would then deliver the transaction over the PCI bus to a second system chipset component which would then deliver the transaction to the disk drive.

Busses such as the PCI bus also provide for communication with other computer system devices such as graphics controllers and network adapters. Because busses such as the PCI bus must interface with a variety of component types, each with varying requirements, the busses are not necessarily optimized for allowing communication between chipset components. Further, chipset manufacturers who rely on standardized busses such as the PCI bus must adhere to bus standards in order to ensure compatibility with other components, and are not at liberty to make substantial changes in how the chipset components communicate with each other. Another issue that faces chipset component manufacturers in designing and manufacturing chipset components is the need to conform to standardized supply and signaling voltages when relying on busses such as PCI for communication between chipset components, thereby locking the manufacturers into certain design practices and manufacturing technologies.

Yet another problem that confronts chipset component manufactures is the requirement of using direct physical side-band interfaces between the system processor and the chipset in order to support legacy operations from past computer system generations. Such side-band interfaces increase the design complexity of a computer system. In addition, the implementation of direct physical connections requires added cost to the manufacture of chipset components. Therefore, it would be desirable to provide a flexible interface that provides optimal communication between chipset components. Moreover, it would be advantageous to provide a method and mechanism for eliminating the necessity to use physical side band interfaces between chipset components and a system processor.

SUMMARY OF THE INVENTION

According to one embodiment, a computer system includes a central processing unit (CPU), a memory control hub (MCH) coupled to the CPU, a point to point interface coupled to the MCH and an input/output control hub (ICH) coupled to the point to point interface. The computer system is adaptable to transmit special cycle signals from the ICH to the CPU via the point to point interface.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Figure 1:
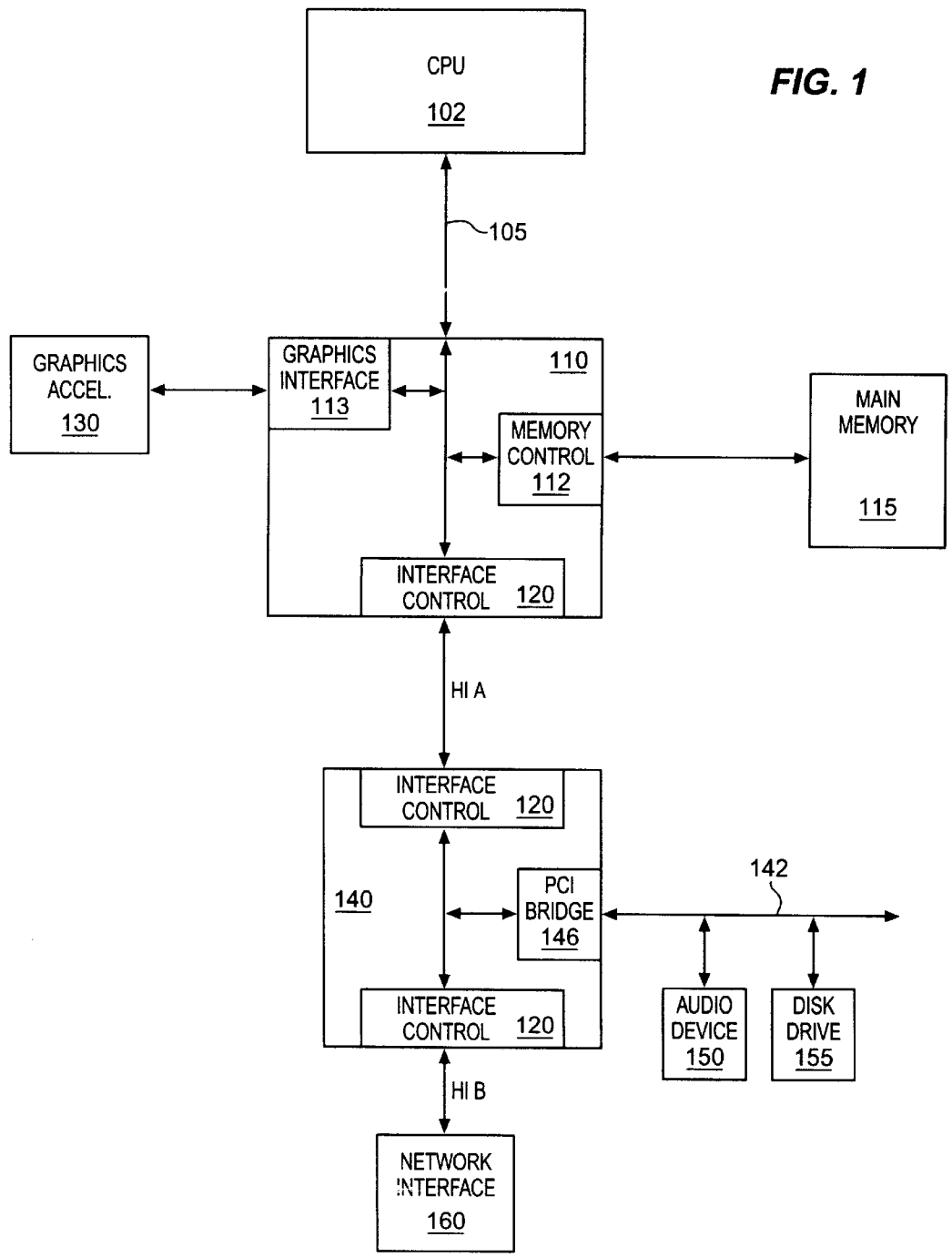
FIG. 1 is a block diagram of one embodiment of a computer system.

A method and mechanism for virtualizing legacy sideband signals in a hub interface architecture is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

The programs including executable instructions may be executed by one or more programming devices (e.g., a central processing unit (CPU), processor, controller, etc.) in one or more personal computer systems, servers, workstations, etc.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family and Pentium® III processors available from Intel Corporation of Santa Clara, Calif. Alternatively, other CPUs may be used.

A memory control hub (MCH) 110 is also coupled to bus 105. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM). However, main system memory 115 may be implemented using other memory types. Additional devices may also be coupled to bus 105, such as multiple CPUs and/or multiple system memories.

MCH 110 may also include a graphics interface 113 coupled to a graphics accelerator 130. In one embodiment, graphics interface 113 is coupled to graphics accelerator 130 via an accelerated graphics port (AGP) that operates according to a Specification Revision 2.0 interface developed by Intel Corporation of Santa Clara, Calif. In addition, MCH 110 includes a hub interface controller 120. Interface controller 120 is used to couple MCH 110 to an input/output control hub (ICH) 140 via a hub interface A. ICH 140 provides an interface to input/output (I/O) devices within computer system 100. ICH 140 also includes a hub interface controller 120 that is used for coupling to MCH 110.

ICH 140 may include other interface controllers 120. For example, a second interface controller 120 may be coupled to a network interface 160 via a hub interface B. Nevertheless, one of ordinary skill in the art will appreciate that other hub interface controllers 120 may be coupled to other devices.

Devices coupled together via a hub interface may be referred to as hub interface agents. A hub interface agent that is positioned closer to CPU 102 in computer system 100 in terms of travel distance may be referred to as an upstream agent, while an agent that is further away from CPU 102 is referred to as a downstream agent. For example, for the MCH 110/ICH 140 hub interface, MCH 110 is the upstream agent and ICH 140 is the downstream agent.

ICH 140 may also include a PCI bridge 146 that provides an interface to a PCI bus. PCI bridge 146 provides a data path between CPU 102 and peripheral devices. Devices that may be coupled to PCI bus 142 include an audio device 150 and a disk drive 155. However, one of ordinary skill in the art will appreciate that other devices may be coupled to PCI bus 142. In addition, one of ordinary skill in the art will recognize that CPU 102 and MCH 110 could be combined to form a single chip. Further graphics accelerator 130 may be included within MCH 110 in other embodiments.

Figure 2:
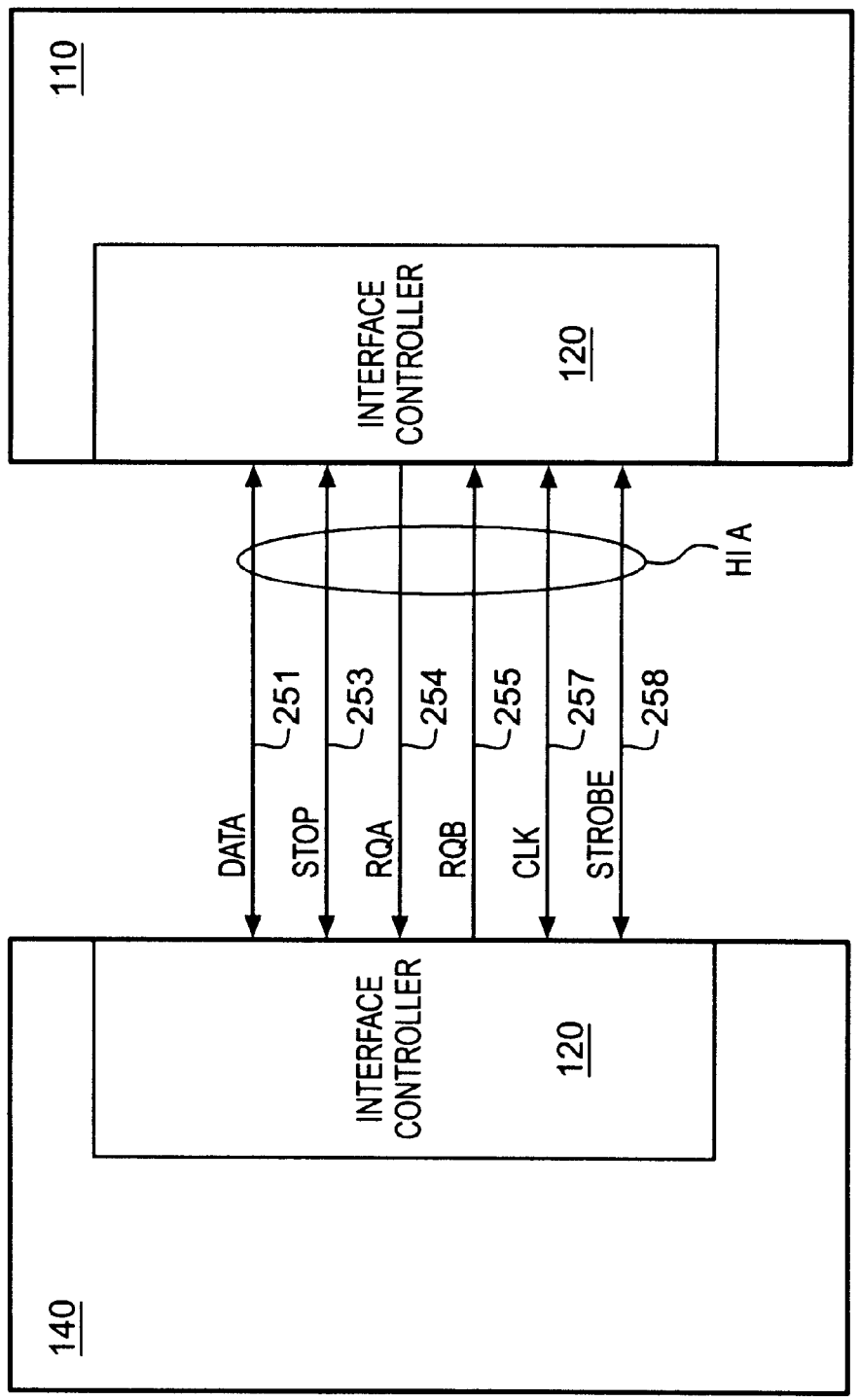
FIG. 2 is a block diagram of one embodiment of a memory control hub (MCH) and an input/output control hub (ICH) connected via a hub interface bus.

FIG. 2 is a block diagram of one embodiment of MCH 110 coupled to ICH 140 via hub interface A. A hub interface is a mechanism for connecting main building blocks of the core logic of a computer system, such as computer system 100, via a relatively narrow and relatively high bandwidth data path. Between individual components in computer system 100, such as between MCH 110 and ICH 140, the connection is implemented in a point-to-point fashion. According to one embodiment, transfer of information across the hub interface bus is accomplished using a packet-based split-transaction protocol. Hub interfaces will be discussed in more detail below.

The hub interface includes a bi-directional data path 251, a stop signal 253, a request A (RQA) signal 254, a request B (RQB) signal 255, a clock (CLK) signal 257 and data strobe (STROBE) signals 258. According to one embodiment, data path 251 is 32 binary bits wide. However, data path 251 may be any width that is a power of 2. Stop signal 243 is a bi-directional signal used for flow control. RQA signal 254 and RQB signal 255 are request signals that, during normal system operation, are asserted in order to request control of the hub interface.

STROBE signals 258 are used to synchronize data into a hub agent while operating in a source synchronous mode. According to one embodiment, STROBE signals 258 may clock data at four times the frequency of the clock signal. Alternatively, STROBE signals 258 may operate at a multiple of the clock signal other than four. For example, STROBE signals 258 may run at a rate of eight times that of the clock signal 257. Further, hub interface A may include other signal paths, such as a reset signal for resetting system 100.

As described above, hub interface A is coupled to the agents via interface controllers 120 within each agent. Interface controllers 120 control the interaction between the hub interface agents. According to one embodiment, hub interface A supports special cycle transactions between MCH 110, ICH 140 and CPU 102 that are used to manage computer system 100. Hub interface special cycle transactions include virtual signals and PCI special cycles.

A. Virtual Signals

Virtual signals are used to communicate various signals between CPU 102, MCH 110 and ICH 140 that are typically communicated in conventional computer systems using individual, directly connected side-band interfaces. By using virtual signals, an indirect interface between CPU 102 and components of MCH 110 and ICH 140 that are several generations behind CPU 102 technology may be supported without the use of a physical side-band interface. In order to implement virtual signals, ICH 140-MCH 110-CPU 102 communications are broken into two separate steps. The communication steps are broken down into an ICH 140-MCH 110 component via hub interface A and a MCH 110-CPU 102 component via bus 105. In order not to obscure the scope of the invention, only the ICH 140-MCH 110 interface component will be described in detail.

For ICH 140 upstream signaling to MCH 110, a hub interface special cycle is used to simultaneously communicate the status of all ICH 140 to MCH 110 signals in the form of a "bulk" message from ICH 140 to MCH 110 via data component 251. According to one embodiment, the hub interface special cycle is a write type cycle using an implied addressing mode with a 32-bit data field. Implied addressing refers to an addressing mode in which information within a special cycle determines the target agent(s) of a particular transaction. Accordingly, a target is not explicitly defined by an address. If a message is received, the targets respond to that message, thus becoming a default addressed agent.

According to a further embodiment, the packet of signals transmitted from ICH 140 to MCH 110 includes such signals as INIT#, A20M#, IGNNE#, INTR, NMI, SMI, STPCLK# and CPUSLP#. These signals represent various processes within computer system 100 that typically use separate side-band connections to transmit signals to CPU 102. For example, the INIT# signal is transmitted to CPU 102 in order to force CPU 102 to begin execution in a known state without flushing a cache or affecting a floating-point state. One of ordinary skill in the art will appreciate that other signals may be included in the packet of signals.

MCH 110 downstream signaling to ICH 140 is communicated from CPU 102 to ICH 140. The mechanism for MCH 110 to ICH 140 virtual signaling is similar to the mechanism for ICH 140 to MCH 110 signaling. According to one embodiment, a FERR# signal is transmitted from MCH 110 to ICH 140. The FERR# signal represents a floating-point error output that is driven active when a[008e] unmasked floating-point error occurs within CPU 102. In conventional computer systems, the FERR# signal is typically transmitted from the CPU using a separate connection. However, one of ordinary skill in the art will appreciate that other signals may be included in MCH 110 to ICH 140 transmissions.

Figure 3:
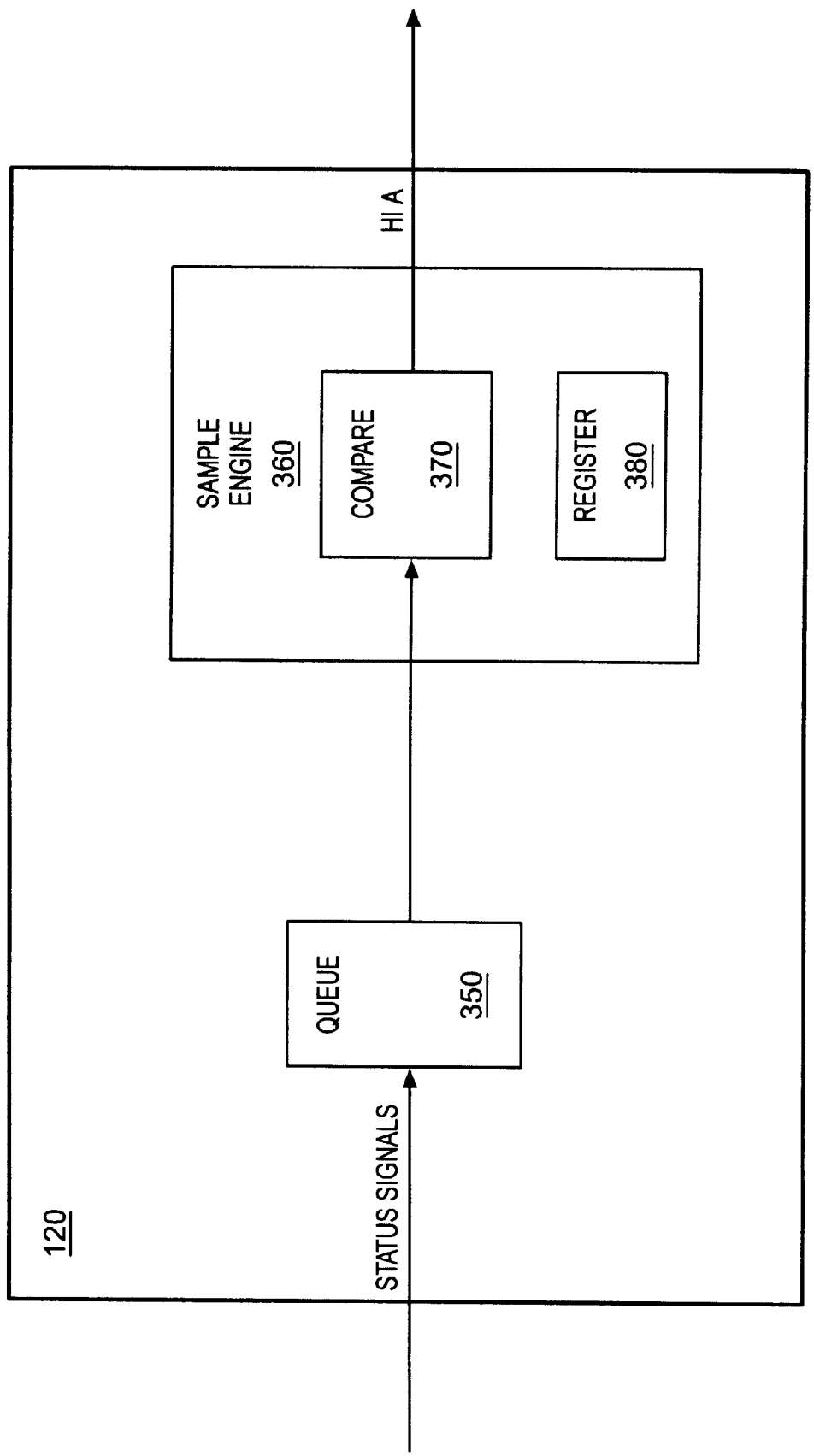
FIG. 3 is a block diagram of one embodiment of an interface controller.

FIG. 3 is a block diagram of one embodiment of an interface controller 120 for implementing MCH 110/ICH 140 signaling. Interface controller 120 includes a queue 350, a sample engine 360 and a comparator 370. Queue 350 receives the status signals from various sources within computer system 100. For example, the A20M# signal is received from a keyboard controller (not shown) coupled to ICH 140 indicating whether computer system 100 is to operate in a real mode or a protected mode.

Queue 350 allows for storage of signals at interface controller 120 at a higher frequency than the worst case latency for sample engine 360. For instance, if a subsequent A20M# signal is received at interface controller before a previous A20M# signal has been sampled at sample engine 360, the subsequent A20M# signal is stored in queue 350. In another embodiment, queue 350 is not included within interface controller if the frequency of changes of the various signals is not higher than the sampling rate of sample engine 360. In such an embodiment, sample engine 360 directly receives the status signals.

Sample engine 360 synchronously and simultaneously samples the status of the received signals. Sample engine 360 detects immediate changes in the events that would normally cause the state to change. Consequently, sample engine 360 transmits virtual signals to CPU 102 so that the signals may be received at CPU 102 in close proximity to the time the signals would have been received in a direct side-band interface. According to one embodiment, sample engine 360 includes a comparator 370 and a register set 380. Register set 380 stores status signals received at sample engine 360 after they are compared at comparator 370. Comparator 370 is used to compare the current status signals received at sample engine 360 with a previous set of sampled signals stored in register set 380.

If the status signals are the first set sampled by sample engine 360, or if a change is detected for at least one signal in the group, a virtual signal message will be sent from ICH 140 to MCH 110, or vice versa. However, if no change is detected, no virtual signal is transmitted. Using ICH 140 signals for example, if the status of the INIT#, IGNNE#, INTR, NMI, SMI STPCLK# and CPUSLP# signals received at comparator 370 remain the same as those stored in register set 380, while the A20M# signal changes, a virtual signal is transmitted to MCH 110 indicating the current status of all of the signals. However, if all of the signals received at comparator 370 are the same as those stored in register set 380, no virtual signals are transmitted.

In other embodiments, other circuitry, such as an edge detector (not shown), may alternatively be used to detect changes in the sampled signals. In such an embodiment, a state machine is included for each status signal to detect a change in status (e.g., 0–>1 or 1–>0). Whenever a transition is detected at one of the state machines, a virtual signal is transmitted corresponding with the state of all of the state machines.

According to a further embodiment, CPU 102 keeps an internal record of the virtual signal events transmitted from sample engine 360 in order to emulate each legacy pin function. Thus, CPU 102 detects assert and deassert conditions. Similarly, ICH 140 records virtual signal changes from CPU 102.

Figure 4:
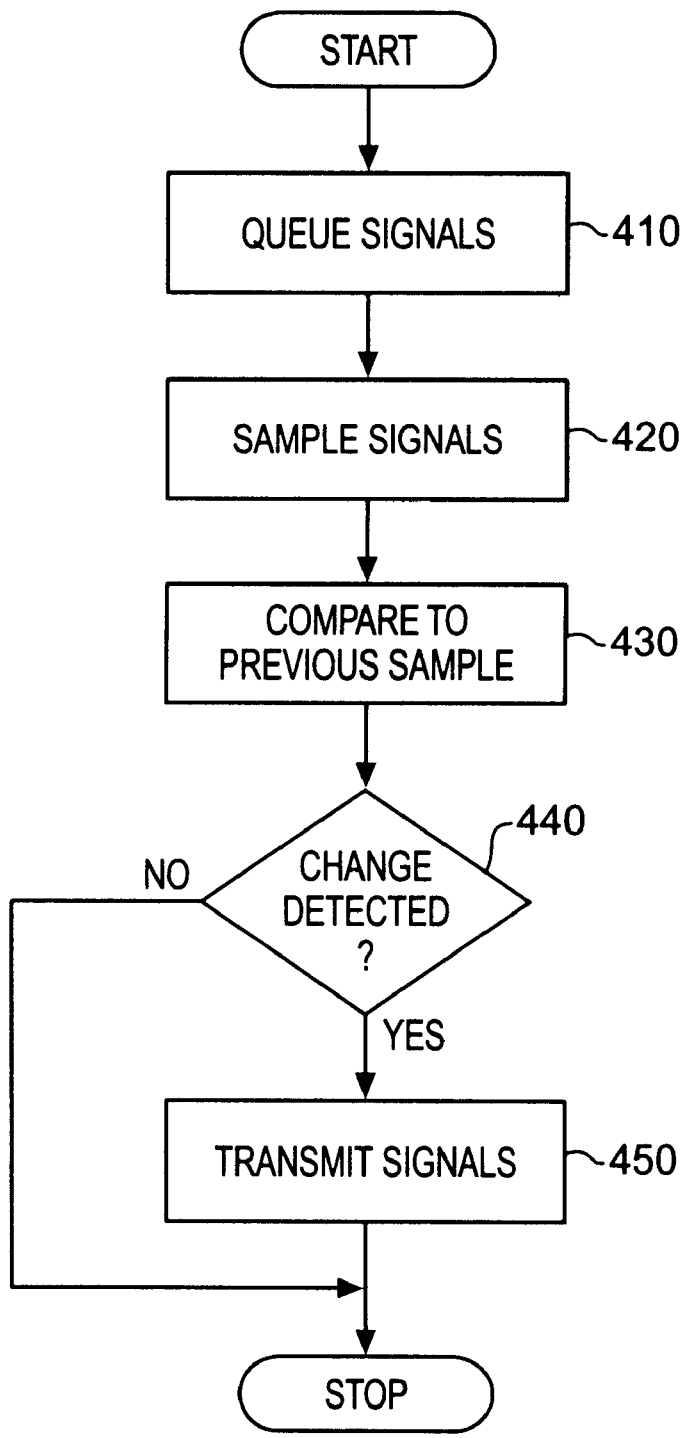
FIG. 4 is a flow diagram of one embodiment for transmitting virtual signals via a hub interface.

FIG. 4 is a flow diagram of one embodiment for transmitting signals via hub interface A. At process block 410, the status signals are stored in queue 350. At process block 420, the signals are sampled at sample engine 360. At process block 430, the status signals are compared at comparator 370 with the previous set of sampled signals. At process block 440, it is determined whether comparator 370 detects a match. If a match is detected, the current set of status signals sampled is the same as the previous set. Consequently, no signals are transmitted via hub interface A. However, if no match is detected at comparator 370, a change in the status of one or more processes has occurred and virtual signals are transmitted over hub interface A, process block 450. As described above, signal transmissions from ICH 140 to MCH 110 are subsequently transmitted to CPU 102, while signal transmissions from MCH 110 to ICH 140 were initially received from CPU 102.

B. PCI Special Cycles

PCI cycle transactions are used to broadcast information from CPU 102 to peripheral devices on bus 142. For example, special cycles such as SHUTDOWN, HALT and STOPGNT are implemented by being mapped directly to data path 251 of hub interface A as a special cycle, rather than being transmitted via a separate side-band interface. In typical computer systems, special cycles were used to indicate the state of the system. Using SHUTDON for example, the only documented method to get from protected to real mode was to cause a triple fault (i.e., a double fault at a fault handler). The processor, upon detecting this event would send the message onto the system bus to indicate the panic condition and then shutdown.

However, when the computer system detected such an event via the special cycle, it would begin a series of events to bring the processor out of the shutdown state into the real mode. Thus, special cycles were broadcast events that used bus messages to drive a common interface and to establish a model consistent to what the processor architecture expected. One of ordinary skill in the art will appreciate that additional PCI special cycle information may be broadcast to peripheral devices on bus 142.

According to one embodiment, hub interface special cycles may also include messages for various computer system 100 functions such as hub interface dynamic mode selection, Advanced Configuration and Power Interface (ACPI) power state transitions, CPU reset control and End-of-Interrupt (EOI) signaling, as well as other functions. As described above, the use of hub interface special cycles eliminates the necessity of including separate side-band signal interfaces between CPU 102 and a chipset, and CPU 102 and peripherals in computer system 100.

Referring back to FIG. 2, the hub agents provide a central connection between two or more separate buses and/or other types of communication lines. By using the hub interface to interconnect the MCH 110 and the ICH 140, improved access is provided between I/O components and the CPU/memory subsystem (e.g., increased bandwidth, protocol independence, and lower latency). In addition, the hub interface may also improve the scalability of a computer system (e.g., upgrading from a base desktop platform to high-end desktop platforms or workstation platform) by providing a backbone for I/O building blocks.

To provide the improved interface, the hub interface includes one or more unique features. In one embodiment, transactions are transferred across the hub interface using a packet based split-transaction protocol. For example, a Request Packet is used to start a transaction and a separate Completion Packet may subsequently be used to terminate a transaction, if necessary.

Figure 5:
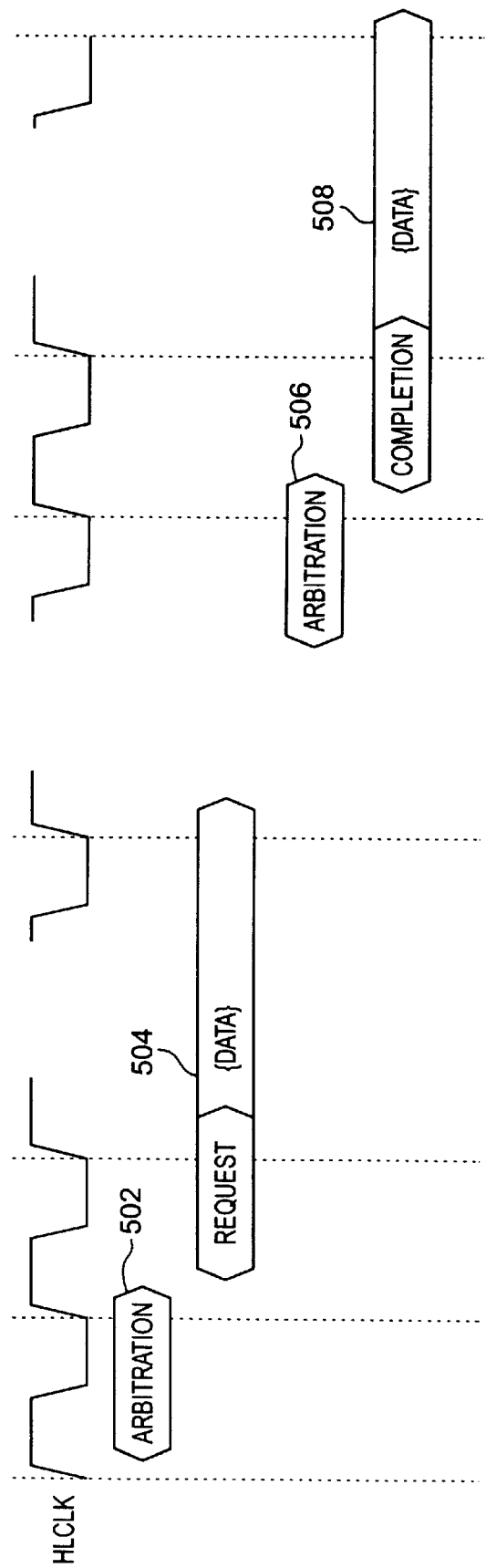
FIG. 5 is a timing diagram illustrating a split transaction implemented by one embodiment of an interface.

FIG. 5 illustrates an example of a split transaction across the hub interface. As illustrated in FIG. 5, a hub agent initially obtains ownership of the hub interface via arbitration 502. Following the arbitration, there is a request phase 504. If necessary (e.g., in the case of returning data for a read transaction), a completion phase 508 will follow the request phase. Prior to the completion phase, however, the responding hub agent, will first arbitrate 506 for ownership of the hub interface.

In between the time of transmitting a request packet and a corresponding completion packet across the hub interface, separate unrelated packets may be transmitted across the hub interface in accordance with predetermined order rules, as discussed below in more detail. For example in the case of a read request from a peripheral to memory, providing the requested data may take multiple clock cycles to have the data ready to be returned in a completion packet. During the time it takes to obtain the requested data, separate unrelated completion and/or request packets waiting in a queue/pipe of the MCH 110, may be transmitted to the ICH 140.

Furthermore, as shown in FIG. 5, each request or completion is transmitted as a packet across the interface. For write type transactions, data is associated with the request. For read type transactions, there will be data associated with the completion. In some cases, there will be more than one completion for a request for the case where the completion packet is disconnected, effectively splitting it into multiple completion packets.

In addition, in one embodiment, the hub interface uses transaction descriptors for routing of hub interface traffic as well as identifying the attributes of a transaction. For instance, the descriptors may be used to define a transaction as isochronous or asynchronous, which, as a result, may then be handled in accordance with a predefined protocol.

Furthermore, in one embodiment, the bandwidth of the interface is increased in part by transmitting the data packets via a source synchronous clock mode. Moreover, in one embodiment, the hub interface provides the increased bandwidth despite using a narrow connection (e.g., less pins/pads).

In alternative embodiments, however, a hub interface may be implemented with less than all of the unique features as discussed above, without departing from the scope of the invention. Moreover, the hub interface could also be used to interconnect bridges and and/or other components within or external to a chipset, without departing from the scope of the resent invention.

TRANSACTION, PROTOCOL AND PHYSICAL LAYERS

For greater clarity, the hub interface is described in three parts: a transaction layer; a protocol layer; and a physical layer. The distinctions between layers, however, is to be regarded in an illustrative rather than a restrictive sense, and is therefore does not to imply a particular preferred embodiment.

TRANSACTION LAYER

In one embodiment of the hub interface, the transaction layer supports the routing of separate transactions transmitted across the hub interface (which may consist of one or more packets). For example, in one embodiment, the transaction layer of the hub interface generates transaction descriptors, which are included in the requests and data packets. The transaction descriptors may be used to support arbitration between queues within a hub agent (e.g., MCH), and/or to facilitate routing of requests and data packets through the hub interface.

For instance, in one embodiment, the transaction descriptors support routing of completion packets back to the request-initiating agent based on initially supplied (within a request packet) routing information. The transaction descriptors also help to reduce or possibly minimize packet-decoding logic within the hub agents.

In alternative embodiments, the transaction descriptors also provide the ability to distinguish the handling of requests based on their respective transaction attributes. For instance, the transaction attributes identified in the transaction descriptors may identify operations as Isochronous (i.e., operations that move fixed amounts of data on a regular basis; e.g., video or audio real time operation). As a result, the operations, as identified by the transaction attributes, may be handled in accordance with a corresponding predetermined routing protocol in order to support a specific type of operation (e.g., isochronous).

In one embodiment, the transaction descriptors include two fields: a routing field and an attribute field. In alternative embodiments, more or less fields may be used to provide one or more of the functions of the transaction descriptors, without departing from the scope of the invention.

In one embodiment, the routing field is a six-bit field used for packet routing, as shown below in Table 1. The size of the routing field, as well as the attribute field, may vary within the scope of the invention.

TABLE 1

Routing Field of Transaction Descriptor

| 5 | 4 | 3 | 2 | 1 | 0 |
|---|---|---|---|---|---|
| Hub ID | | | Pipe ID | | |

As shown in Table 1, three bits of the routing field are used for the Hub ID which identifies the hub agent that initiated the transaction. In alternative embodiments, to provide a hub interface hierarchy exceeding 8, additional bits could be used in the routing field.

For example, there may exist multiple hub interface hierarchies in a system, in which case the agent at the top of the hierarchies should be capable of routing completions back to the base of the hierarchy. In this context, "hierarchy" consists of multiple connected hub interface segments starting from a hub interface "root" agent (e.g., a MCH). For instance, computer system 100 may have only one hub interface hierarchy. FIG. 1, however, illustrates an example of computer system 100 based on multiple hub interface hierarchies. In embodiments implementing only a one hub interface hierarchy, a default value of "000" may be used in the Hub ID field.

The remaining three bits of the routing field may be used to identify internal pipes/queues within a hub interface agent. For example the I/O Control Hub may support internal USB (Universal Serial Bus) host controller traffic and Bus Mastering ID (BM-ID) traffic via separate "pipes." As such, the Pipe ID may be used communicate to the servicing agent (e.g., MCH) that traffic initiated by different "pipes" have different attributes, and may be handled in accordance with a predetermined protocol. If a hub interface agent does not implement separate internal pipes, it may use a default value of "000" in the Pipe ID field.

In an alternative embodiment, the transaction descriptors further include an attribute field. In one embodiment, the attribute field is a three-bit value, which specifies how a transaction is to be handled when a target hub interface agent receives it. In some cases, the attribute field helps a system support demanding application workload, which relies on the movement, and processing of data with specific requirements or other differentiating characteristics.

For example, the attribute field may support the isochronous movement of data between devices, as used by a few recently developed external busses. Such data movement requirements need to be maintained as data flows through the hub interface between I/O devices and the CPU/memory subsystem.

In alternative embodiments, additional transaction attributes may include the ability to differentiate between "snooped" traffic where cache coherency is enforced by hardware (i.e., chipset) and "non-snooped" traffic that relies on software mechanisms to ensure data coherency in the system. Moreover, another possible attribute would be an "explicitly refetchable" hint, to support a form of read caching and allow for more efficient use of the ain memory bandwidth.

Ordering Rules

The transaction descriptors can also be used to support ordering rules between transactions transmitted across the hub interface. For example, in one embodiment, transactions with identical transaction descriptors are executed in strong order (i.e., first come-first serve).

Transactions having the same routing field but different attribute fields, however, may be reordered with respect to each other. For example, in one embodiment, isochronous transactions do not need to be strongly ordered with respect to asynchronous transactions.

In addition, in one embodiment of the hub interface, data transmissions are permitted to make progress over requests, either in the same direction or the opposite direction. Read completions flowing in one direction are allowed to pass read requests flowing in the same direction. And, write requests are allowed to pass read requests flowing in the same direction.

In alternative embodiments, however, the ordering rules for transactions travelling across the hub interface, may vary within the scope of the invention. For example, in one embodiment, the hub interface implements the ordering rules provided in Peripheral Component Interconnect (PCI) (Revision 2.2) to determine the flow of traffic across the hub interface in opposite directions.

PROTOCOL LAYER

In one embodiment, the hub interface uses a packet-based protocol with two types of packets: request and completion. A request packet is used for each hub interface transaction. Completion packets are used where required, for example, to return read data, or to acknowledge completion of certain types of write transactions (e.g., I/O writes and memory writes with requested completion). Completion packets are associated with their corresponding request packets by transaction descriptors and ordering, as previously discussed in the section on the Transaction Layer.

In addition, in one embodiment, the hub interface uses an arbitration protocol that is symmetric and distributed. For example, each hub agent drives a request signal, which is observed by the other agent attached to the same interface. No grant signal is used, and agents determine ownership of the interface independently.

Moreover, in one embodiment, no explicit framing signal is used. There is an implied relationship between the arbitration event that gives an agent ownership of the interface and the start of that agent's transmission. In alternative embodiment, framing signals could be used without departing from the scope of the invention.

The end of a packet transmission occurs when a hub interface agent that owns the interface (e.g., is in the process of transmitting data), releases its control of the interface by de-asserting a request signal. In addition, in one embodiment, flow control is also accomplished by using a STOP signal to retry or disconnect packets, as is described in more detail below.

Packet Definition

In one embodiment of the hub interface, data is transferred at a multiple rate (e.g., 1×, 4×, 8×) of the hub interface clock (HLCK), which in one embodiment is a common clock shared by the hub agents joined by the hub interface. The data is transmitted across a data signal path (PD) of the hub interface, which has an "interface width" of some power of two (e.g., 8, 16, 24, 32). As a result, the hub interface may have varying data transfer granularities (i.e., transfer widths), depending upon the transfer rate and the width of the data signal path. For example, in the case of an eight-bit interface width in 4×mode, the transfer width is 32 bits per HLCK. As a result, by varying the transfer rate and/or the interface width of the data signal path, the transfer width (i.e., number of bytes transferred per HLCK) can be scaled.

In addition, in one embodiment, packets may be larger than the transfer widths. As a result, the packets are transmitted in multiple sections (i.e., packet widths.) In one embodiment, the packets are divided into packet widths the size of double words (32 bits).

In the case of a 32 bit transfer width, the bytes of a packet width are presented on the interface starting with the least significant byte (byte 0) and finishing with the most significant byte (byte 3), as shown below in Table 2. In the case of a 64 bit transfer width (e.g., a sixteen bit wide interface in 4×mode) the less significant double-word (packet width) is transferred on the lower bytes of the data signal (e.g., PD [0:7]) and the more significant double-word is transferred in parallel on the upper bytes of the data signal (e.g., PD [15:8]). The two examples are shown below in table 2.

of a transfer width; a data section of a packet (if present) starts on the first byte of a transfer width; and a packet occupies an integral number of transfer widths.

Any available transfer widths not consumed by a packet may be filled with a bogus double word (DW) transmission, and will be ignored by the receiving hub agent. In alternative embodiments, more, less, and/or different framing rules may be used by the hub interface within the scope of the present invention.

Table 3 and Table 4 set forth below, illustrate examples of the framing rules given above for the case of a 64 bit transfer width.

TABLE 2

Byte Transmission Order for 8 and 16 Bit Interface Widths

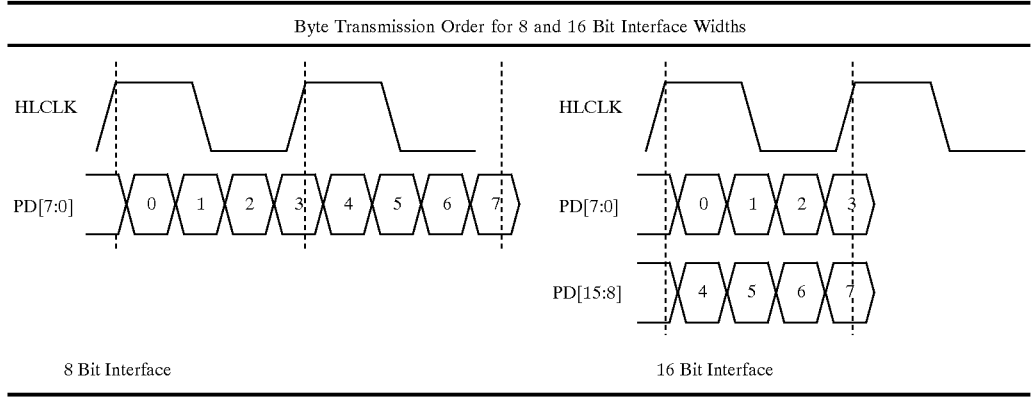

8 Bit Interface            16 Bit Interface

The Protocol Layer of the hub interface is also responsible for framing the data. As such, the framing rules implemented by the hub interface define how to map one or more packet widths onto a set of transfer widths. To simplify the parsing of packets into packet widths, in one embodiment of the hub interface, the following three framing rules are implemented: a header section of a packet starts on the first byte

TABLE 3

Request using 32 Bit Addressing and Containing Three Double-words of Data

| 4th byte Transmitted on PD[15:8] Byte 7 | 3rd Byte Transmitted on PD[15:8] Byte 6 | 2nd Byte Transmitted on PD[15:8] Byte 5 | First Byte Transmitted on PD[15:8] Byte 4 | 4th Byte Transmitted on PD[7:0] Byte 3 | 3rd Byte Transmitted on PD[7:0] Byte 2 | 2nd Byte Transmitted on PD[7:0] Byte 1 | First Byte Transmitted on PD[7:0] Byte 0 |
|---|---|---|---|---|---|---|---|
| Address (32b) Second DW of Date {Bogus DW} | | | | Request Header First DW of Data Third DW of Data | | | |

TABLE 4

Request using 64 Bit Addressing and Containing Three Double-words of Data

| 4th Byte Transmitted on PD[15:8] Byte 7 | 3rd Byte Transmitted on PD[15:8] Byte 6 | 2nd Byte Transmitted or PD[15:8] Byte 5 | First Byte Transmitted on PD[15:8] Byte 4 | 4th Byte Transmitted on PD[7:0] Byte 3 | 3rd Byte Transmitted on PD[7:0] Byte 2 | 2nd Byte Transmitted on PD[7:0] Byte 1 | First Byte Transmitted on PD[7:0] Byte 0 |
|---|---|---|---|---|---|---|---|
| Address (31:2) {Bogus DW} Second DW of Data {Bogus DW} | | | | Request Header Address (63:32) First DW of Data Third DW of Data | | | |

Request Packets

The packet header format for request packets, according to one embodiment, is shown below in Table 5 and Table 6. In the examples shown in Tables 5 and 6, the base header is one double-word, with one additional double-word required for 32 bit addressing, and two additional double-words required for the 64 bit addressing mode. The fields of the headers, as shown in Tables 5 & 6 are described below the tables.

In alternative embodiments of the hub interface, the fields included in the header of the request packet may vary without departing from the scope of the invention. For example, the header may include additional field, less fields, or different fields in place of the fields shown below. Moreover, the encoding of the fields may also vary without departing from the scope of the invention.

TABLE 5

Request Packet Header Format for 32 bit Addressing

Last Byte Transmitted ... First Byte Transmitted 31 30 29 28 27 26 25 24 | 23 22 21 20 19 18 17 16 | 15 14 13 12 11 10 9 8 | 7 6 5 4 3 2 1 0

| rq/cp | r/w | cr | af | lk | Transaction Desc. Routing Field | Reserved | TD Attr | Space | Data Length (DW) | Last DW BE | 1st DW BE | Base |

| Addr[31:2] | R | ea/ct | Address |

TABLE 6

Request Packet Header Format for 64 bit Addressing

Last Byte Transmitted ... First Byte Transmitted 31 30 29 28 27 26 25 24 | 23 22 21 20 19 18 17 16 | 15 14 13 12 11 10 9 8 | 7 6 5 4 3 2 1 0

| rq/cp | r/w | cr | af | lk | Transaction Desc. Routing Field | Reserved | TD Attr | Space | Data Length (DW) | Last DW BE | 1st DW BE | Base |

| Addr[31:2] | R | ea | 32 bit component |

| Addr[63:32] | | | 64 bit component |

| Field | Description |
|---|---|
| Transaction Descriptor | The Transaction Descriptor Routing and Attribute fields as previously described. |
| rq/cp | Request packets are identified with a '0' and completion packets with a '1' in this location. |
| cr | Completion required ('1') or no completion required ('0'). |
| r/w | Read ('0') or Write ('1'). This field indicates if data will be included with a completion (read) or a request (write). |
| Address Format (af) | The addressing format is either Implied ('0') or 32/64 bit ('1'). |
| Lock (lk) | Flag to indicate that the request is part of a locked sequence. Requests and completions in a locked sequence will have this bit set. Hub agents, which do not comprehend lock, ignore this flag and will fill this field with '0'. |
| Data Length | The data length is given in double-words, encoded such that the number of double-words represented is one plus this number. Thus, "000000" represents one double-word. |
| Space | This field selects the destination space type for the request. In one embodiment, possible destination spaces include Memory ("00"), and IO ("01"). |
| 1st DW BE | Byte enables for the first double-word of any read or write request to Memory or IO. Byte enables are active low. If there is only one double-word for a request, this byte enable field is used. In one embodiment, it is illegal to issue a memory or IO read or write request with no bytes enabled. |
| Last DW BE | Byte enables for the last double-word of any read or write request. Byte enables are active low. If there is only one double-word for a request, this field must be inactive ("1111"). Byte enables may be discontiguous (e.g.: "0101"). This field is never used with special cycles since it overlaps the "Special Cycle Encoding" field. |

TABLE 6-continued

Request Packet Header Format for 64 bit Addressing

| Last Byte Transmitted | | | | | | | | | | | | | | | | | | | | | | | | First Byte Transmitted | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |

| rq cp | r/w | cr | af | lk | Transaction Desc. Routing Field | Reserved | TD Attr | Space | Data Length (DW) | Last DW BE | 1st DW BE | Base |
|---|---|---|---|---|---|---|---|---|---|---|---|---|

| Addr[31:2] | R | ea | 32 bit component |
|---|---|---|---|

| Addr[63:32] | 64 bit component |
|---|---|

| | |
|---|---|
| Addr[31:2] | The 32 bit address is generated as it would be on PCI for same type of cycle. This double-word is included for the 32 and 64 bit addressing modes (but not for the implied addressing mode). |
| Extended Address (ea) | Indicates 32 bit addressing ('0') or 64 bit addressing ('1'). |
| Config Type (ct) | For configuration cycles only, this bit is used to indicate Type 0 ('0') or Type 1 ('1') configuration cycle type. Because configuration cycles will always be performed with 32 bit addressing, this bit is overlapped with the "Extended Address" bit. |
| Addr[63:32] | Upper address bits for 64 bit addressing mode. This double-word is included for the 64 bit addressing mode. |

The header format for a completion packet, according to one embodiment, is shown below in Table 7. In one embodiment, the header is one double-word. The fields of the headers, as shown in Table 8 are described following the table.

In alternative embodiments of the hub interface, however, the fields included in the header for a completion packet may vary without departing from the scope of the invention. For example, the header may include additional field, less fields, or different fields in place of the fields as described and shown below. Moreover, the encoding of the fields may also vary without departing from the scope of the invention.

requested so long as the entire request is eventually completed. Likewise, completions for memory writes may indicate that less than the entire request has been completed. This might be done to satisfy a particular hub interface latency requirement for a particular platform.

In addition, for a request that requires completion, the initiator, in one embodiment, retains information about the request, which may be stored in a buffer of the initiating hub agent. For example, this information may include the transaction descriptor, the size of the packet, lock status, routing information, etc. Furthermore, when receiving the completion(s), the initiator matches the completion(s) with

TABLE 7

Completion Packet Header Format

| Last Byte Transmitted | | | | | | | | | | | | | | | | | | | | | | | | First Byte Transmitted | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |

| rq cp | r/w | Reserved | lk | Transaction Desc. Routing Field | Reserved | TD Attr | Rsvd | Data Length (DW) | Completion Status |
|---|---|---|---|---|---|---|---|---|---|

| | |
|---|---|
| Transaction Descriptor | The Transaction Descriptor Routing and Attribute fields as previously discussed in the Transaction section. |
| rq/cp | Completion packets are identified with a '1' in this location. |
| r/w | Read ('0') or Write ('1'). This field indicates if data will be included with a completion (read) or a request (write). |
| Lock (lk) | Flag to indicate that the completion is part of a locked sequence. Requests and completions in a locked sequence will have this bit set. Agents, which do not comprehend lock, ignore this flag and will fill this field with '0'. |
| Data Length | The data length is given in double-words, encoded such that the number of double-words represented is one plus this number. Thus, "000000" represents one double-word. |
| Completion Status | Indicates completion status using predetermined. |
| Reserved | All reserved bits are set to '0'. |

In one embodiment of hub interface, completions for memory reads may provide less than the full amount of data the corresponding request. In the case of multiple completions, the initiator accumulates a count of the data completed for the original request until the original request is fully completed.

Interface Arbitration and Packet Framing

In one embodiment of the hub interface, when the interface is idle, the assertion of a request from either hub agent connected to the interface is considered an arbitration event. The first agent to request wins ownership of the interface. If agents request ownership simultaneously when the hub interface is idle, the least recently service hub agent wins. In one embodiment, all hub agents track the least recently serviced status (e.g., via a status flag of an internal register). In alternative embodiments, alternative arbitration routines may be used within the scope of the present invention.

Once a hub agent acquires the ownership of the interface, it will continue to own the interface until it completes its transaction, or until an allocated time bandwidth expires. For example, in one embodiment, a timeslice counter is provided in each hub agent to control bandwidth allocation and to limit an agent's interface ownership tenure. The time allotted to a hub agent (i.e., timeslice value) may be different or the same for hub interface agents attached to the same interface. The timeslice counter is started upon acquiring ownership of interface and counts hub interface base clock periods.

In one embodiment, each hub agent is responsible for managing its own timeslice allocation. As such, in one embodiment, a timeslice value may be programmed via a hub interface command register for each interface in each hub agent.

Figure 6:
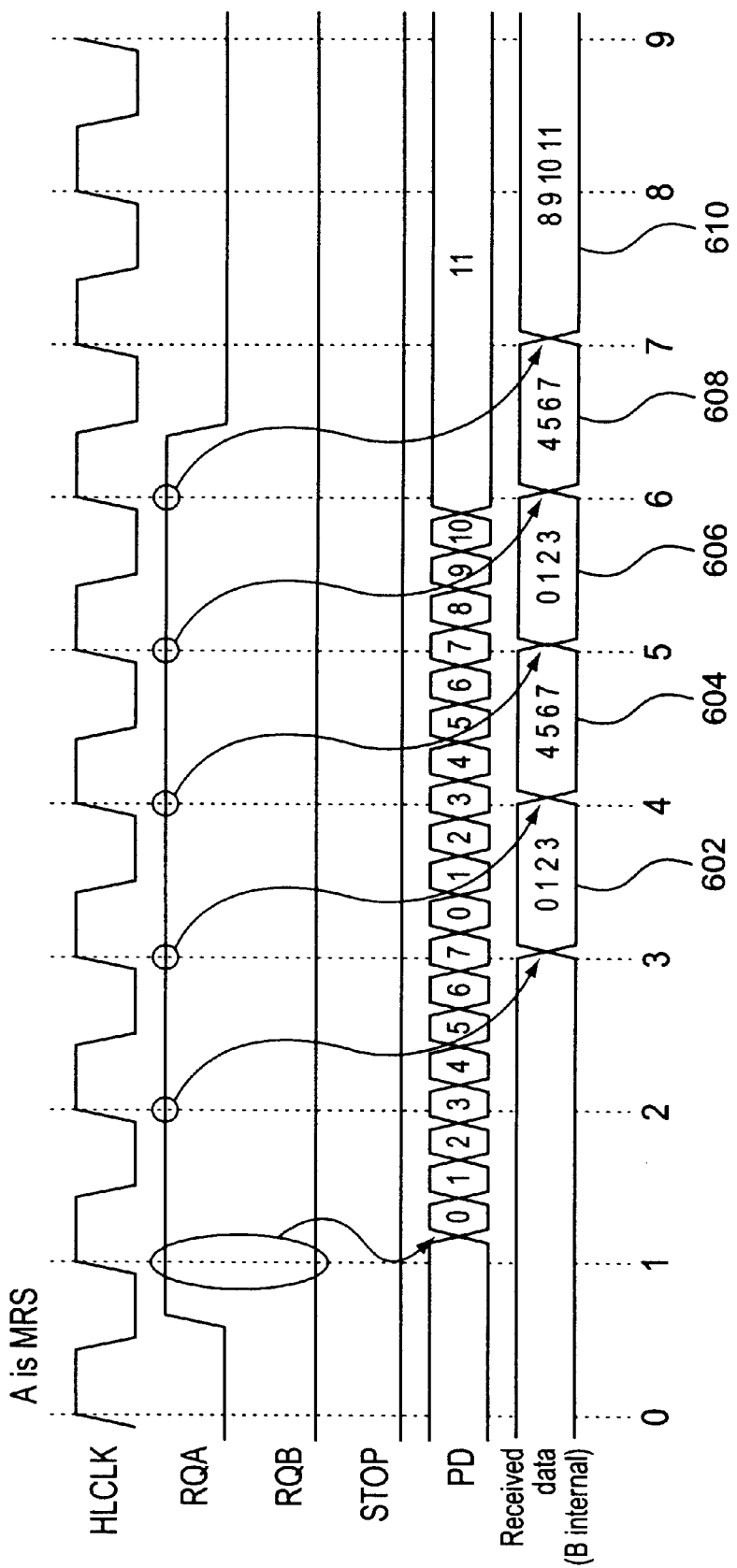
FIG. 6 is a timing diagram illustrating arbitration and transmission of data packets, according to one embodiment.

FIG. 6 illustrates an example of arbitration for the hub interface between hub agent A and agent B and the transfer of two packets. The example illustrates arbitration out of an idle interface state, with the interface then returning to idle. Moreover, in the example illustrated, the interface is using a 4× data transfer mode with eight bit data signal (PD) path. Agent A, in the example illustrated in FIG. 6, is the most recently serviced (MRS) agent. As a result, Agent A asserts its external request signal (RQA) and samples the state of the Agent B's request signal (RQB) on clock edge 1 (which is shown to be inactive) before starting packet transmission off the same edge.

In one embodiment, there is a two clock delay before the transmitted data (i.e., data from Agent A) is available internally in the receiver (i.e., Agent B), starting from clock edge 3. The first packet consists of two double-words 602 and 604 and requires two base clocks to transmit in the 4× mode. The second packet is three double-words 606, 608, and 610, and so requires three base clocks in the 4× mode.

Flow Control

In one embodiment, packets may be retried or disconnected by a receiving agent due to lack of request queue space, data buffer space, or for other reasons. In one embodiment, Flow control is accomplished using a STOP signal.

Figure 7:
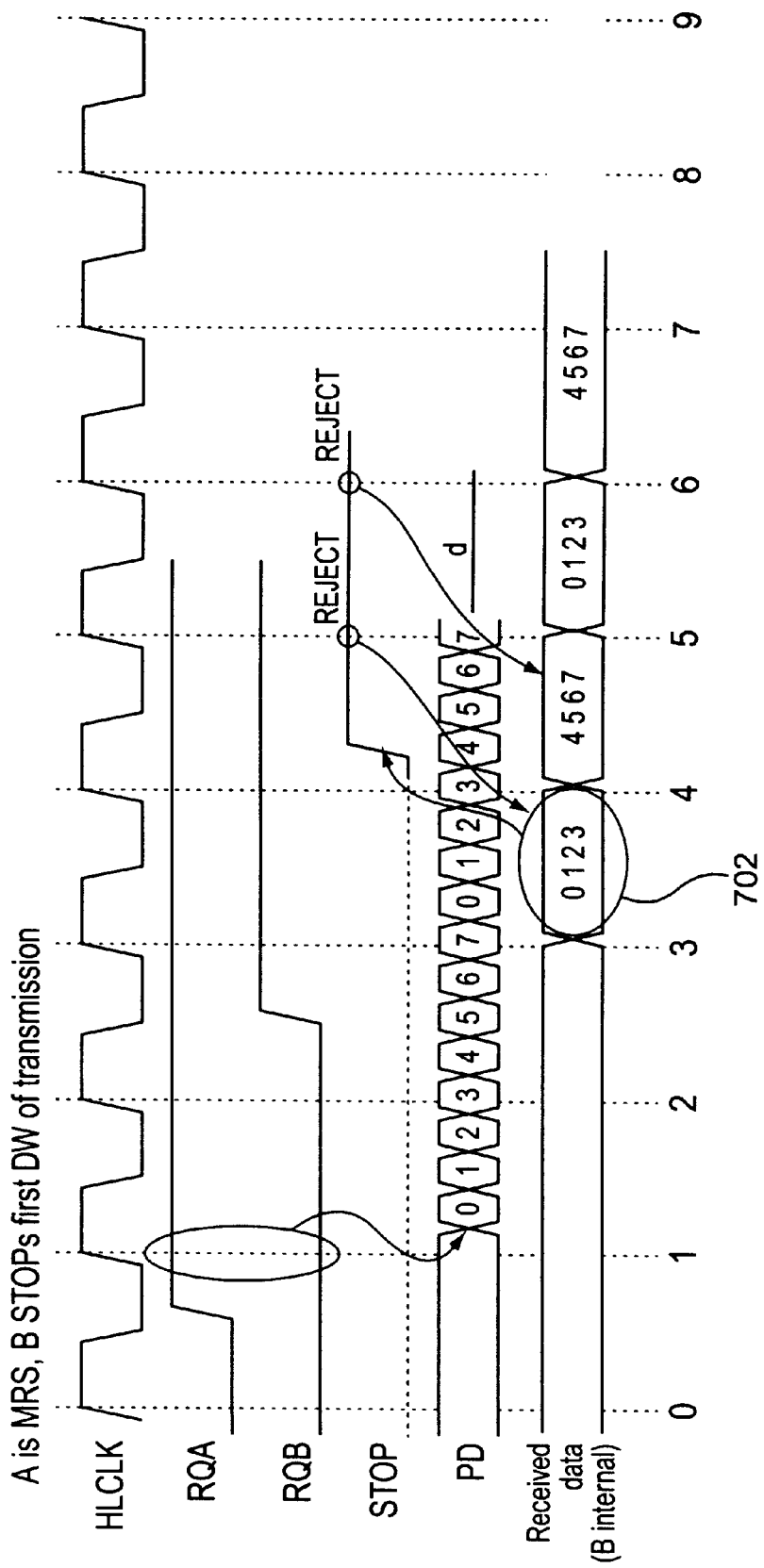
FIG. 7 is a timing diagram illustrating flow control of data packets, according to one embodiment.

FIG. 7 illustrates an example of the use of STOP signal. As illustrated, Agent A asserts its external request signal (RQA) and samples the state of the Agent B's request signal (RQB) on clock edge 1 (which is shown to be inactive) before starting packet transmission off the same edge (e.g., clock edge 1). Following a two clock delay, the data transmitted from Agent A is available internally in the receiver at Agent B, starting from clock edge 3. In one embodiment, following receipt of data transmitted from Agent A, is the first opportunity for Agent B to enact flow control by asserting the STOP signal, as illustrated in FIG. 7, at clock edge 4.

In addition, when ownership of PD signal changes from one hub agent to another, ownership of the STOP signal will be also be exchanged following a predetermined number of clocks. Moreover, in one embodiment, the STOP signal is sampled on base clocks, which correspond to the final transfer of a packet width. For example, in a 4× mode (using an eight bit wide PD signal), the STOP signal is sampled each base clock. However, for a 1× mode, the STOP signal is sampled each fourth clock (with the beginning of a transaction being used as a reference point).

Figure 8:
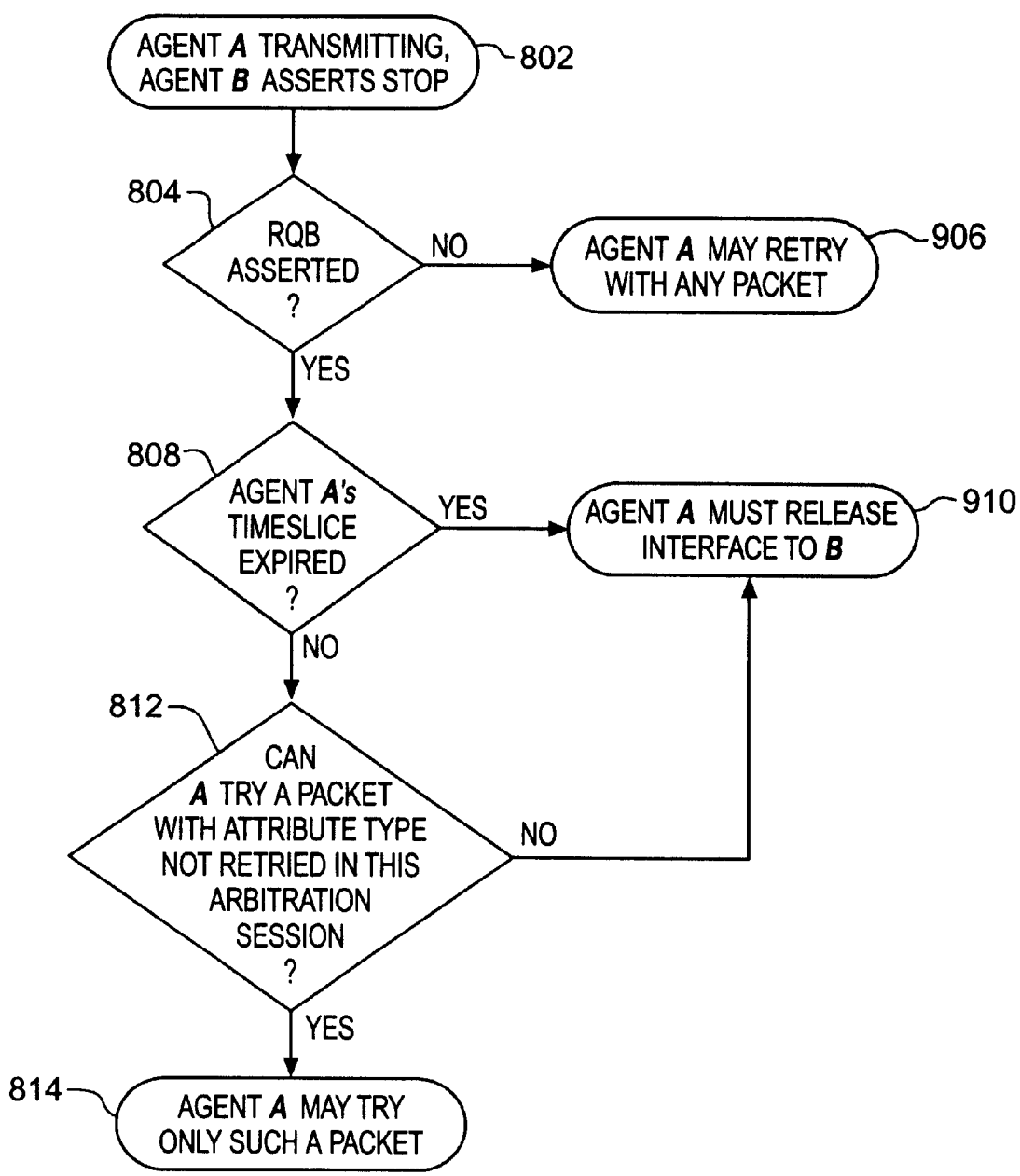
FIG. 8 illustrates a flow diagram describing the steps of responding to flow control operations according to one embodiment.

Following the reception of a STOP signal, the hub agent that receives the STOP signal determines whether it may retry sending additional packets. FIG. 8 is a flow diagram describing the steps performed by a hub agent in determining whether it may retry sending a packet following receipt of a STOP signal, according to one embodiment.

In step 802, a hub agent that is currently transmitting packets receives a STOP signal. In response, in step 804 the hub agent that receives the STOP signal determines if the other agent (which activated the STOP signal) is requesting ownership of the interface, by sampling the other hub agents request signal (e.g., RQB).

If the recipient of the STOP signal determines that the agent which sent the STOP signal is not requesting ownership of the interface, in step 806 the current owner of the interface may attempt to transmit a packet following recovery from the STOP. On the other hand, if it is determined that the agent which activated the STOP signal is requesting ownership, in step 808, the current owner determines if its timeslice has expired.

If the timeslice for the current owner of the interface has expired, in step 810, the current owner releases ownership. If the timeslice for the current owner has not expired, the current owner may transmit a packet with an attribute that is different from the interrupted packet. More specifically, in step 812, the current owner determines if it has a packet with a attribute type that is different from any packets that have been retried in the present arbitration session (i.e., the period of the current owner's tenure), which needs to be transmitted.

If the current owner does have a packet with a different attribute, in step 814 the current owner may attempt to transmit the packet. Otherwise, the current owner release ownership of the interface.

PHYSICAL INTERFACE

In one embodiment, the hub interface implements a physical interface that operates at a base frequency of either 66 MHz or 100 MHz. Other frequencies may also be used. In addition, in one embodiment, the physical interface uses a source synchronous (SS) data transfer technique which can be quad-clocked to transfer data at 4× of the base hub interface clock. As a result, in an embodiment having an 8-bit data interface (e.g., PD) operating at a base frequency of 66 MHz or 100 MHz, a bandwidth of 266 megabytes per second (MB/s) or 400 MB/s may be achieved, respectively.

Furthermore, in one embodiment, the hub interface supports a voltage operation of 1.8V, and is based on complementary metal-oxide semiconductor process (CMOS) signaling. In an alternative embodiments, however, the interface may operate at alternative frequencies and/or alternative sized data interfaces to provide varying bandwidths, and support alternative operating voltages, based on alternative signal processing, without departing from the scope of the invention.

External Signals Definition

Figure 9:
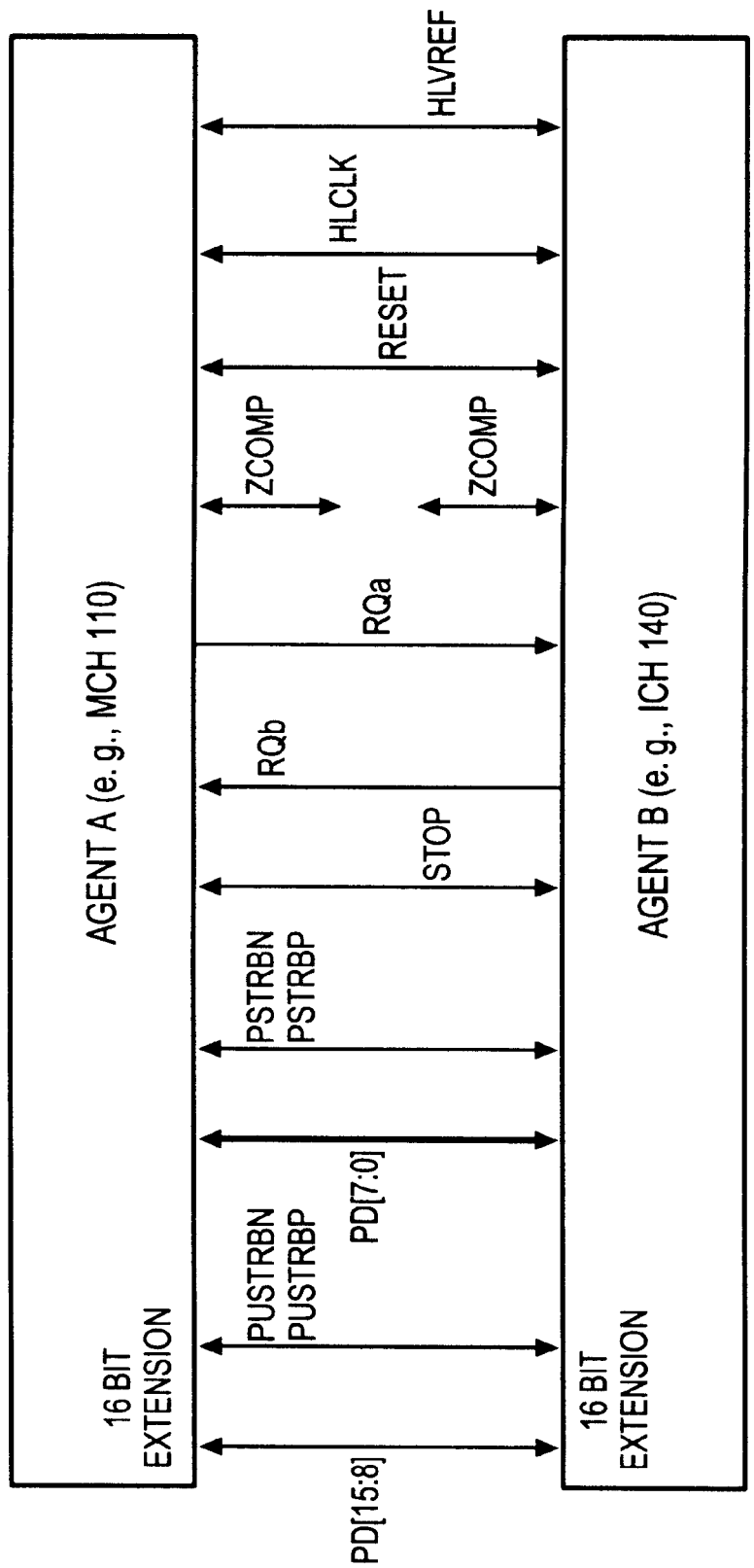
FIG. 9 illustrates the physical signal interface according to one embodiment.

FIG. 9 illustrates the physical signal interface of the hub interface between two hub agents, according to one embodiment. As shown in FIG. 9, the hub interface physical interface uses a bidirectional eight bit data bus (PD [7:0]) with a differential pair of source synchronous strobe signals (PSTRBN, PSTRBP) for data clocking. In an alternative embodiment, the interface can widened. For example, as shown in FIG. 9, an additional eight bit data bus (PD [15:8]) can also be used along with an additional pair of pair of source synchronous strobe signals (PUSTRBN, PUSTRBP.) Moreover, in an alternative embodiment, unidirectional data signals could be used.

In addition, one unidirectional arbitration signal connects each agent to the other (RQA, RQB), and a bidirectional STOP signal is used by the receiving agent to control data flow, as previously described. Additional interface signals include the system reset (Reset), common clock (HLCLK) and voltage reference signals (HLVREF). As well, signals for each hub agent (ZCOMP) to match its driver output impedance to the appropriate value to compensate for manufacturing and temperature variations are also included.

The physical signals shown in the interface illustrated in FIG. 9 are further described below in Table 8. In alternative embodiments of the hub interface, the signals included in the physical interface may vary without departing from the scope of the invention. For example, the physical interface may include more, less or different signals varying from the signals shown in FIG. 9 and further described below in Table 8.

TABLE 8

Hub Interface Signals for Eight Bit Agents

| Name | Bits (Pads) | Type | Clock Mode | Description |
|---|---|---|---|---|
| PD[7:0] | 8 | ASTS[1] | SS[2] | Packet data pins. The data interface when idle, in one embodiment, is held by active sustainers at the last voltage value to which it was driven. |
| PSTRBP | 1 | ASTS | SS | Negative PD Interface Strobe (default voltage level = VSSHL) and Positive PD Interface Strobe (idle voltage level = VCCHL) together provide timing for 4X and 1X data transfer on the PD[7:0] interface. The agent that is providing data drives this signal. PSTRBN and PSTRBP should be sensed fully differentially at the receiver. |
| PSTRBN | 1 | ASTS | SS | Positive PD Interface Strobe, see PSTRBP description above |
| RQB | 1 | I/O | CC[3] | Active-high request from agent A (output from A,input to B) to obtain ownership of the hub interface. RQA is asserted when agent A has data available to send, and is deasserted when either all of agent A's data has been sent or agent A determines that it should release the interface. Reset voltage value is VSSHL. |
| RQA | 1 | I/O | CC | Request from agent B (output from B, input to A). See above description of RQa. |
| STOP | 1 | ASTS | CC | Used for pipelined flow control to retry or disconnect packets |
| HLCLK | 1 | I | N/A | hub interface base clock, in one embodiment, either 66MHz or 100MHz. This provides timing information for the common clock signals (described further below. |
| RESET# | 1 | I | CC | Active-low reset indication to hub interface agents.[4] |

TABLE 8-continued

Hub Interface Signals for Eight Bit Agents

| Name | Bits (Pads) | Type | Clock Mode | Description |
|---|---|---|---|---|
| HLVREF | 1 | I | N/A | Voltage reference (VCCHL/2) for differential inputs. In one embodiment, the voltage is generated on the motherboard through a voltage divider. |
| HLZCOMP | 1 | I/O | N/A | Provides Impedance Compensation. |
| VCCHL | 4 | power | N/A | 1.8V |
| VSSHL | 4 | ground | N/A | |
| Total: | 25 | | | |

[1]ASTS = Actively Sustained Tri-State.
[2]SS = Source Synchronous Mode Signal
[3]CC = Common Clock Mode Signal
[4]In one embodiment, Reset is a system-wide signal; it is an output from one component of the system and an input to the other component(s). Moreover, Reset is asynchronous with respect to HLCLK.

Common Clock Transfer Mode Operation

In one embodiment, many of the signals transmitted across the hub interface are transmitted in accordance with a common clock mode. More specifically, the timing of the signals that are transmitted via the common clock mode are referenced to a single clock (e.g., the hub interface clock). In alternative embodiments, the signals may be tied to a system clock, exterior to the hub interface agents. Moreover, there may be more than one hub interface segment in a system, in which case different base clocks may be used for the different segments. For example, one component might implement both a 66 MHz base hub interface and a 100 MHz base hub interface.

Source Synchronous Transfer Mode Operation

In one embodiment, the packets/data are transmitted using a source synchronous clock mode, which provides a technique for multiplying the data transfer rate of data. For example, in an embodiment using 4× source synchronous clocking mode with an eight bit data signal path, transmitting a double-word (i.e., four byte) requires only one hub interface clock cycle (HLCK). Alternatively, transmitting a double word using 1× source synchronous clocking mode on an eight bit data signal path would require full hub interface clock cycle to complete.

More specifically, in one embodiment of source synchronous transmission, strobes (e.g., PSTRBN/PSTRBP) are sent with a data transmission in accordance with a predetermined timing relationship between the strobes and the data. The strobes are thereafter used to latch the data into the receiving hub agent.

More specifically, in one embodiment, the edges of the strobes PSTRBP/PSTRBN are used by the receiving hub agent to identify the presence and timing of data being transferred across the data signal paths. For example, as illustrated in the timing diagram of FIG. 10, in one embodiment a first data transfer corresponds to the rising edge of PSTRBP and the falling edge of PSTRBN. A second data transfer corresponds to the rising edge of PSTRBN and the falling edge of PSTRBP.

Figure 10:
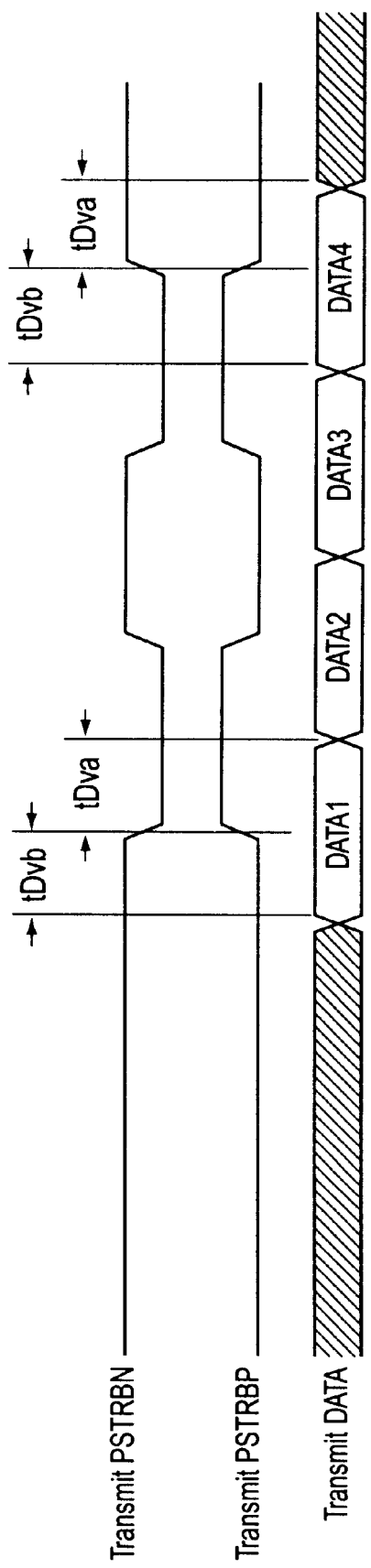
FIG. 10 is a timing diagram illustrating source synchronous clocking according to one embodiment.

In addition, in one embodiment, as further shown in FIG. 10, the transmit edges of the strobes PSTRBP/PSTRBN are positioned near the center of the data valid window. As a result, the receiving agent is given an input data sampling window to accommodate various system timing skews.

Moreover, in one embodiment a minimum data valid before strobe edge (tDvb), and a minimum data valid after strobe edge (tDva) are also used by the receiving hub agent to identify and latch data being transmitted. Once the receiving hub agent latches the incoming data, the data is thereafter held for brief period to resynchronize the data with the hub interface clock (HLCK) before being passed along within the hub agent.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

Accordingly, a method and mechanism for eliminating the necessity of using physical side band interfaces between chipset components and a system processor has been described.

What is claimed is:

1. A computer system comprising:
   a central processing unit (CPU);
   a memory control hub (MCH) coupled to the CPU;
   a point to point interface coupled to the MCH; and
   an input/output control hub (ICH) coupled to the point to point interface,
   wherein the computer system is adaptable to transmit virtual legacy cycle signals from the ICH to the CPU via the point to point interface.

2. The computer system of claim 1 further comprising a bus coupled between the CPU and the MCH, wherein the virtual legacy cycle signals received at the CPU are forwarded from the MCH via the bus.

3. The computer system of claim 2 wherein the CPU is adaptable to transmit virtual legacy cycle signals to the ICH via the bus, the MCH and the point to point interface.

4. The computer system of claim 1 wherein the virtual legacy cycle signals comprise virtual signals, wherein the virtual signals represent the status of process within the computer system.

5. The computer system of claim 4 wherein the ICH includes a first interface controller and the MCH includes a second interface controller.

6. The computer system of claim 5 wherein the first and second interface controllers comprise:
   a queue; and
   a sample engine.

7. The computer system of claim 6 wherein the sample engine comprises:
   a comparator; and
   a register set.

8. The computer system of claim 6 wherein the sample engine comprises an edge detector.

9. The computer system of claim 1 further comprising:
   a Peripheral Component Interface (PCI) coupled to the ICH; and
   a peripheral device coupled to the PCI.

10. The computer system of claim 9 wherein the virtual legacy cycle signals comprise PCI virtual legacy cycle signals transmitted from the peripheral device to the ICH via the PCI.

11. A method comprising:
    receiving a first set of status signals at an input/output control hub (ICH), the first set of status signals corresponding to one or more legacy operations in a computer system;
    transmitting a first set of virtual signals corresponding to the first set of status signals to a memory control hub (MCH) via a hub interface; and
    transmitting the first set of virtual signals to a central processing unit (CPU).

12. The method of claim 11 further comprising:
    detecting a change in the status signals at the ICH corresponding to the one or more legacy operations;
    determining whether the change corresponding to the second set of status signals match the first set of status signals;
    if not, transmitting a second set of virtual signals corresponding to the second set of status signals to the MCH via the HUB interface; and
    transmitting the second set of virtual signals to the CPU.

13. The method of claim 12 wherein receiving the first and second set of status signals comprise:
    storing the status signals in a queue; and
    a sampling the status signals.

14. The method of claim 12 wherein determining whether the second set of status signals match the first set of status signals comprises comparing the first and second set of status signals at a comparator within the ICH.

15. A method comprising:
    receiving a first set of status signals at a memory control hub (MCH) from a central processing unit (CPU), the first set of status signals corresponding to one or more legacy operations in a computer system; and
    transmitting a first set of virtual signals corresponding to the first set of status signals to an input/output control hub (ICH) via a hub interface.

16. The method of claim 15 further comprising:
    receiving a second set of status signals at the MCH from the CPU corresponding to the one or more legacy operations;
    determining whether the second set of status signals match the first set of status signals; and
    if not, transmitting a second set of virtual signals corresponding to the second set of status signals to the ICH via the HUB interface.

17. A hub interface comprising:
    an input/output control HUB (ICH);
    a point to point interface link coupled the ICH; and
    a memory control HUB (MCH) coupled to the point to point interface link;
    wherein the ICH is adaptable to transmit virtual signals to the MCH via the point to point interface link, the virtual signals representing one or more legacy operations performed in a computer system.

18. The hub interface of claim 17 wherein the virtual signals are transmitted from the MCH to a central processing unit (CPU).

19. The HUB interface of claim 17 wherein the MCH is adaptable to transmit virtual signals to the ICH via the point to point interface link.

* * * * *

UNITED STATES PATENT AND TRADEMARK OFFICE
CERTIFICATE OF CORRECTION

PATENT NO. : 6,446,154 B1
DATED : September 3, 2002
INVENTOR(S) : Cadien et al.

It is certified that error appears in the above-identified patent and that said Letters Patent is hereby corrected as shown below:

Column 8,
Line 24, delete "resent", insert -- present --.

Column 9,
Line 60, delete "refetchable", insert -- prefetchable --.
Line 61, delete "ain", insert -- main --.

Signed and Sealed this

Fourth Day of February, 2003

JAMES E. ROGAN
*Director of the United States Patent and Trademark Office*